United States Patent
Jung et al.

(10) Patent No.: US 6,655,820 B2
(45) Date of Patent: Dec. 2, 2003

(54) ILLUMINATION SYSTEM FOR A DISPLAY APPARATUS

(75) Inventors: Myung-ryul Jung, Suwon (KR); Chi-wang Son, Suwon (KR)

(73) Assignees: Samsung Electronics Co., Ltd., Suwon (KR); Accupix Inc., Suwon (KR)

( * ) Notice: Subject to any disclaimer, the term of this patent is extended or adjusted under 35 U.S.C. 154(b) by 0 days.

(21) Appl. No.: 09/984,783

(22) Filed: Oct. 31, 2001

(65) Prior Publication Data

US 2002/0109993 A1 Aug. 15, 2002

(30) Foreign Application Priority Data

Feb. 14, 2001 (KR) .......................................... 2001-7339

(51) Int. Cl.$^7$ ................................................. F21V 9/12
(52) U.S. Cl. ............................ 362/318; 362/335; 345/7; 359/630
(58) Field of Search ................................. 362/318, 322, 362/341, 335; 345/7, 8, 9; 359/630–636, 839; 353/98

(56) References Cited

U.S. PATENT DOCUMENTS 6,222,676 B1 * 4/2001 Togino et al. .............. 359/626
6,342,871 B1 * 1/2002 Takeyama ..................... 345/7

* cited by examiner

Primary Examiner—Sandra O'Shea
Assistant Examiner—Ali Alavi
(74) Attorney, Agent, or Firm—Staas & Halsey LLP

(57) ABSTRACT

An illumination system for a display apparatus is capable of reducing electric power consumption and lengthening a life span by minimizing a loss of marginal rays that are spaced away from a main optical axis. The minimum loss of the marginal rays is obtained by a light reflective surface of a predetermined degree of curvature formed on an optical device for diffuse-reflecting and altering an optical path of a light from a light source.

14 Claims, 1 Drawing Sheet

ILLUMINATION SYSTEM FOR A DISPLAY APPARATUS

CROSS-REFERENCE TO RELATED APPLICATIONS

This application claims the benefit of Korean Application No. 2001-7339, filed Feb. 14, 2001, in the Korean Patent Office, the disclosure of which is incorporated herein by reference.

BACKGROUND OF THE INVENTION

1. Field of the Invention

The present invention relates to a display apparatus, and more particularly, to an illumination system for a display apparatus for use by an individual, such as a Head Mount Display apparatus (HMD).

2. Description of the Related Art

Generally, an HMD is mounted on a face or a head of a user in the form of eyeglasses or a helmet, for allowing the user to obtain image information. The HMD apparatus is a type of image displaying apparatus for individual use, which is usually used in Virtual Reality systems, flight simulators, etc. FIG. 1 illustrates a conventional head mount display apparatus 100, in which light is emitted from a light source 11, and an optical path thereof is altered by a series of optical units 12 and 13. Accordingly, the light is condensed on an image generator 14 such as a liquid crystal display (LCD) or the like, generating an image which is magnified and projected on eyes 10 of an observer through a projected lens 15.

The optical unit 12 diffuse-reflects the light emitted from the light source 11, and alters the optical path thereof. The optical unit 12 can be a prism, a diffuse reflectance plate, or the like. The optical unit 13 reflects the light, which is diffuse-reflected by the optical unit 12 to a different optical path. By reflecting the light, the optical unit 13 condenses the light on the image generator 14. optical unit 13 can be a polarization filter such as a polarizing beam splitter (PBS), or the like.

According to the conventional HMD apparatus 100, since the prism or the diffuse reflectance plate that comprises the optical unit 12 has a planar light reflecting surface, marginal rays (a) and (b) of the light, which are spaced relatively far away from a main optical axis (c), are usually lost, and the optic efficiency is deteriorated.

SUMMARY OF THE INVENTION

Accordingly, it is an object of the present invention to overcome the above-mentioned problems of the related art, and accordingly, it is an object of the present invention to provide an illumination system for a display apparatus, and more particularly, to provide an effective illumination system for a display apparatus for individual use, capable of reducing electric power consumption and lengthening a life span thereof through an improved light utilization efficiency.

Additional objects and advantages of the invention will be set forth in part in the description which follows, and, in part, will be obvious from the description, or may be learned by practice of the invention.

The above object is achieved with an illumination system for a display apparatus according to the present invention, including a light source; an image generator generating an image by using a light emitted from the light source; and an optical condenser having a light reflective surface condensing the light emitted from the light source on the image generator by diffuse-reflecting the light. The light reflective surface of the optical condenser has a predetermined degree of curvature. According to the present invention, the optical condenser includes a reflecting mirror or a prism having a light reflective surface curved by a predetermined degree of curvature, diffuse-reflecting the light emitted from the light source and condensing the light on the image generator.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
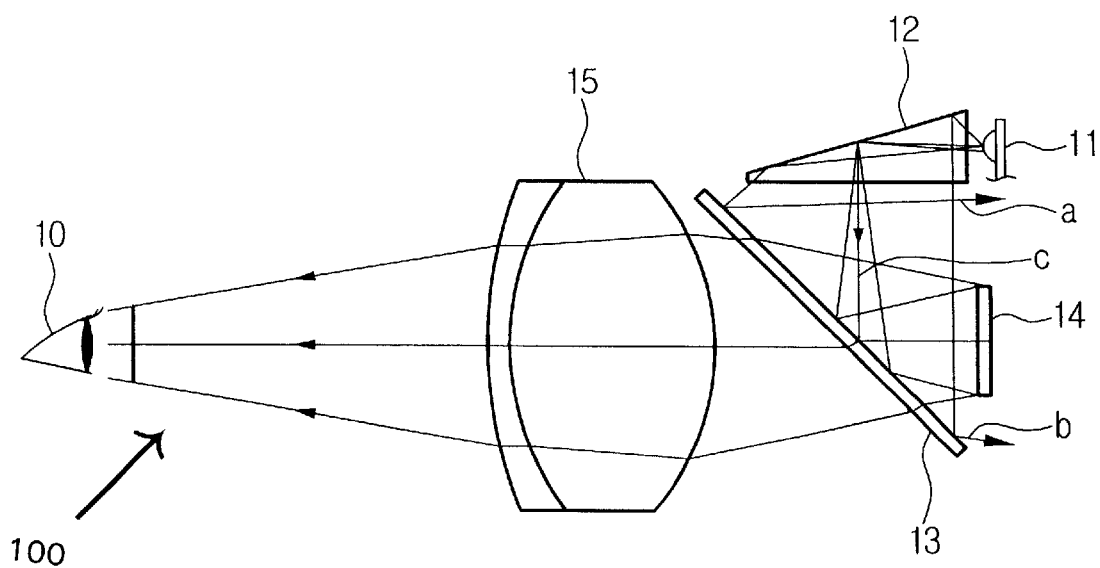
FIG. 1 is a schematic view showing a conventional illumination system for a head mount display apparatus.

Reference will now be made in detail to the present preferred embodiments of the present invention, examples of which are illustrated in the accompanying drawings, wherein like reference numerals refer to like elements throughout.

Figure 2:
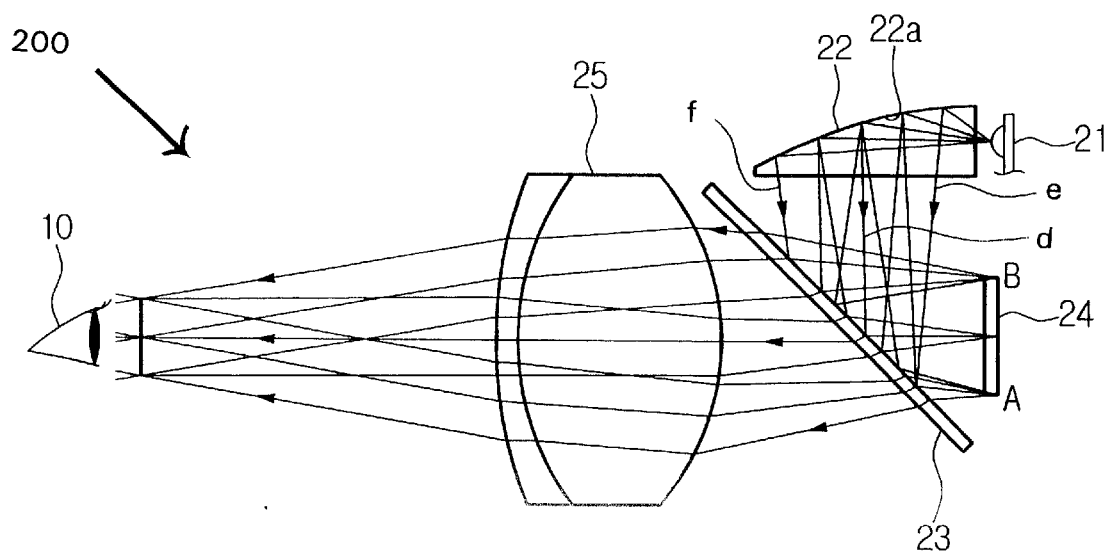
FIG. 2 is a schematic view showing an illumination system for a head mount display apparatus according to the present invention.

Referring to FIG. 2, an illumination system 200 for a display apparatus for individual use includes a light source 21 such as a light emitting diode (LED) to generate and emit white light, a series of optical units 22 and 23 arranged to alter an optical path of the light emitted from the light source 21, an image generator 24 such as a reflective liquid crystal display (LCD) for generating an image by using the light, and a projected lens 25 to magnify and project the image generated by the image generator 24 to the eyes 10 of the observer.

The optical unit 22 alters the optical path of the light emitted from the light source 21, by diffuse-reflecting the light. As shown in FIG. 2, the optical unit 22 has a light reflective surface 22a, that is formed to have a predetermined degree of curvature.

Among the light emitted from the light source 21, marginal rays (e) and (f), spaced from a main optical axis (d), are incident on outer areas A and B of the image generator 24, respectively. Accordingly, even the marginal rays (e) and (f), that are remotely incident at a predetermined angle with respect to the main optical axis (d) are mostly condensed on the image generator 24. As a result, the amount of lost rays can be reduced, while the light utilization efficiency can also be improved by a uniform illumination.

According to the present invention, the optical unit 22 can be a prism, a diffuse reflectance plate, a reflecting mirror, or the like. Also, the light reflective surface 22a of the optical unit 22 can have various degrees of curvature corresponding to relevant environments, such as a size of the image generator 24, or the like. The optical unit 22 condenses the light on the optical unit 23. The optical unit 23 reflects the light that is diffuse-reflected by the light reflective surface 22a of the optical unit 22, and accordingly condenses the light on the image generator 24. The optical unit 23 can be a PBS.

According to the illumination system 200 for the display apparatus, the light emitted from the light source 21 is diffuse-reflected by a concave light reflective surface 22a of the optical unit 22, and accordingly the optical path of the light is shifted. While some rays are passed, other rays are reflected by the optical unit 23 and are incident on the image generator 24, including the marginal rays (e) and (f). The image generator 24 emits the image, which is generated by using the condensed light, to pass through the optical unit 23 and on an optical incident surface of the projected lens 25 so that the projected lens 25 magnifies and projects the image to each of the eyes 10 of the observer.

As described above, in the illumination system 200 for the display apparatus for individual use according to the present invention, due to the optical unit 22 having the light reflective surface 22a of a predetermined degree of curvature, which alters the optical path of the light by diffuse-reflection, the loss of marginal rays that are spaced away from the main optical axis can be reduced, while the light utilization efficiency is considerably increased due to uniform illumination. As a result, the electric power consumption can be reduced, and the life span of the parts can be lengthened.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An illumination system for a display apparatus, comprising:

a light source emitting light;

image generator for generating an image using the light emitted from the light source; and optical unit having a light reflective surface for condensing the light emitted from the light source on the image generator by diffuse-reflecting the light, the light reflective surface of the optical unit having a predetermined degree of curvature.

2. The illumination system of claim 1, wherein the optical unit is a reflecting mirror.

3. The illumination system of claim 1, wherein the optical unit is a prism.

4. The illumination system of claim 1, wherein the image generator is a reflective liquid crystal display (LCD).

5. A system comprising:

a light source to emit a light;

an image generator to generate an image by using the light; and an optical condensor having a curved light reflective surface to condense the light emitted from said light source on said image generator, the light condensed on said image generator having a uniform illumination.

6. The system of claim 5, wherein said optical condenser condenses the light by diffuse-reflecting the light.

7. The system of claim 5, wherein said light reflective surface has a predetermined degree of curvature.

8. The system of claim 7, wherein the predetermined degree of curvature corresponds to a size of said image generator.

9. A system comprising:

a light source to emit a light;

an image generator to generate an image by using the light;

an optical condenser having a curved light reflective surface to condense the light emitted from said light source on an optical reflector by diffuse-reflecting the light; and a projected lens, the light on the image generator being reflected through said optical reflector and focused by said projected lens on an eye of the user.

10. The system of claim 5, wherein said light reflective surface is concave.

11. The system of claim 6, further comprising an optical reflector in an optical path of the light between said optical condenser and said image generator, wherein said optical condenser condenses the light on said optical reflector, and said optical reflector reflects the light onto said image generator.

12. The system of claim 11, wherein the optical reflector is a polarizing beam splitter (PBS).

13. A method to generate an image, comprising:

emitting light; and condensing the light on an image generator with an optical condenser having a curved surface, the light condensed on said image generator having a uniform illumination.

14. A head mount display comprising:

a light source to emit a light;

an image generator to generate an image by using the light; and an optical condenser having a curved light reflective surface to condense the light emitted from said light source on said image generator by diffuse-reflecting the light.

* * * * *